April 5, 1960 R. J. BROWN 2,931,429
DUAL FUEL SYSTEM FOR GAS TURBINE POWERPLANT
Filed Dec. 26, 1956
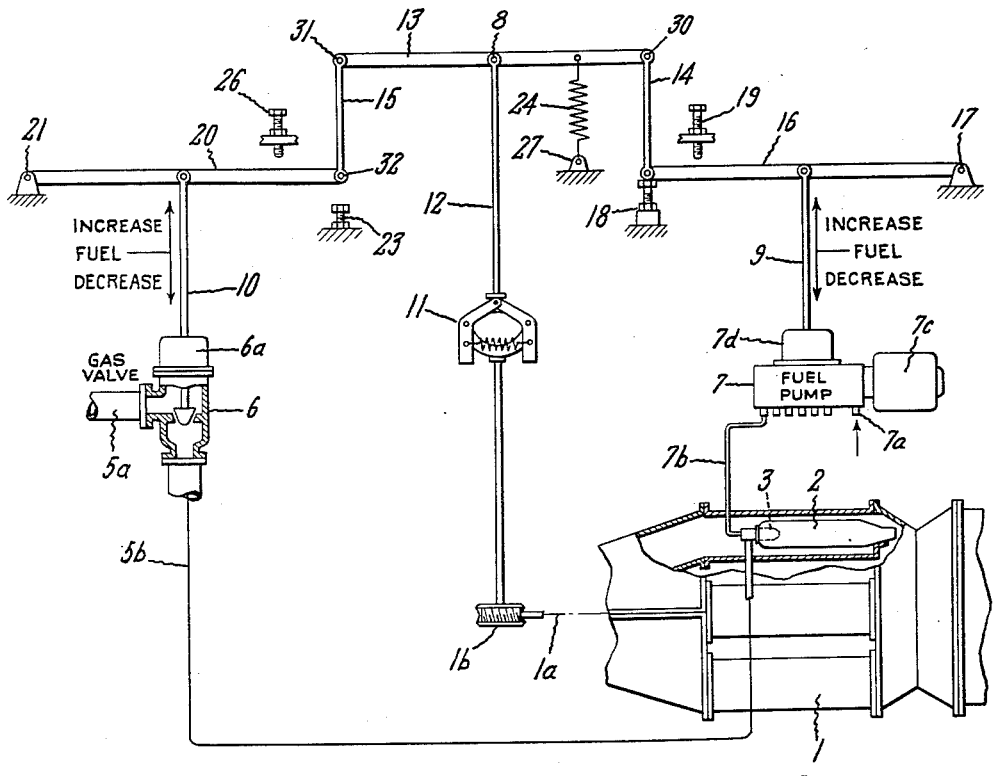
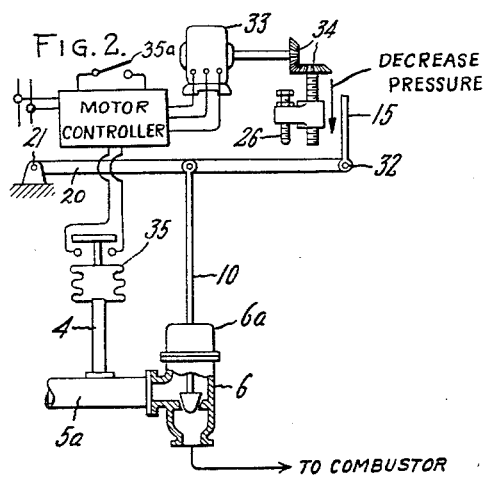
INVENTOR.
ROBERT J BROWN
BY
HIS ATTORNEY

United States Patent Office 2,931,429
Patented Apr. 5, 1960

2,931,429

DUAL FUEL SYSTEM FOR GAS TURBINE POWERPLANT

Robert J. Brown, Schenectady, N.Y., assignor to General Electric Company, a corporation of New York Application December 26, 1956, Serial No. 630,518

2 Claims. (Cl. 158—11)

This invention relates to fluid fuel regulating systems, particularly to a system for supplying two different types of fluid fuels to a thermal powerplant such as a gas turbine.

Fuel systems that are capable of supplying either all natural gas, or all some alternate fuel, or part of each, at a preselected ratio to each other have been successfully employed in gas turbine powerplants. Such systems, when both fuels are being used, continuously supply the two fuels in a fixed ratio, regardless of wide variations in the fuel requirements. A dual fuel system of this type is disclosed, for instance, in U.S. Patent 2,637,334, issued May 5, 1953 on an application of N. E. Starkey and assigned to the same assignee as the present application. However, while in some instances it is desirable to utilize two fuels at a preselected ratio to each other, it can be appreciated that in a place where a more economical fuel is available, such as natural gas in a gas producing area, it would be more economical to arrange the powerplant to use such fuel to the maximum extent desired, and to employ a secondary fuel only when an insufficient supply of the primary fuel is available. It is, of course, also desirable that the change from one fuel to the other, or variation in the maximum quantity of each fuel to be used, be readily effected.

Accordingly, it is an object of my invention to provide a dual fuel system which operates on a chosen fixed quantity of one fuel and supplies a second fuel only in the event the turbine calls for fuel in excess of the fixed quantity of the preferred fuel.

A specific object is to provide a linkage system actuated by a speed governor which will automatically regulate the supply of two fuels to a thermal powerplant so that a first fuel is continuously supplied to the turbine, and a second fuel is supplied only after a preselected quantity of the first fuel is being used.

Other objects and advantages will become apparent from the following description taken in connection with the accompanying drawings, in which:

Fig. 1 is a schematic view of a dual fuel system incorporating the invention; and Fig. 2 is a modified form of the dual fuel system.

In accordance with the illustrated embodiment, the invention relates to a dual fuel system for a thermal powerplant comprising a linkage mechanism controlled by a turbine governor and designed to control the supply of a preferred fuel to the turbine until a preselected quantity thereof is being used, which linkage mechanism includes special means for maintaining a second fuel control mechanism inoperative. The linkage mechanism is designed to actuate the second fuel supply mechanism to provide a second fuel to supplement the preferred fuel when the preferred fuel supply decreases or becomes insufficient to maintain the speed and load demands of the turbine.

Referring now more particularly to Fig. 1, the dual fuel system is shown applied to a gas turbine 1, containing a combustor 2 to which fuel is supplied through a spray nozzle 3. The combustor may, for instance, be constructed and arranged in accordance with the principles of the "Nerad combustor," described in detail in U.S. Patent 2,601,000, issued June 17, 1952, in the name of A. J. Nerad and assigned to the assignee of the present application. The fuel nozzles may be of any suitable type, but are preferably a single nozzle assembly having passages for receiving both a liquid and gaseous fuel and discharging them through a plurality of orifices so as to produce a desired spray pattern in the combustion space. Such dual fuel nozzles are known in the art, and the mechanical details thereof are not material to an understanding of the present invention.

The liquid fuel oil is drawn by a suitable pump 7 from a reservoir (not shown) through inlet conduit 7a and discharged through a supply conduit 7b. While various pumps of this general type may be employed, a suitable one is shown in U.S. Patent 2,709,449, issued May 31, 1955 to D. E. Garr and M. A. Edwards and assigned to the assignee of the present invention. By way of example only, the multi-piston pump 7 is shown connected by separate supply conduits to each of the combustors 2. The pump may either be driven by suitable gearing from the shaft of the turbine or by a separate motor, as illustrated at 7c in the drawing. The natural gas or other gaseous fuel flows through an inlet conduit 5a, conventional gas valve 6, and outlet conduit 5b to the combustor 2. The discharge rate of the fuel from pump 7 and valve 6 varies in accordance with the dictates of servo mechanisms indicated diagrammatically at 7d, 6a respectively. These mechanisms may, for instance, take the form of any suitable type of hydraulic servo mechanism arranged to vary the displacement of the pump 7 and valve 6 in accordance with input signals communicated by control rods 9, 10, respectively, which are part of the novel fuel control mechanism to be described later in detail. The details of the pump 7, valve 6, servo mechanism 7d, 6a are not important here. It need only be noted that movement of the control rods 9, 10 upwardly increases the rate of fuel supply and movement downwardly decreases the fuel supply rate.

The fuel pump and gas control valve are controlled through a special linkage mechanism by means responsive to an operating condition of the powerplant such as speed, load, etc., and as illustrative of such control I have shown a centrifugal flyweight speed governor 11. The centrifugal flyweight governor 11, driven from the turbine shaft 1a by suitable gearing 1b, functions to push the rod 12 upwardly upon a decrease in rotor speed, and to pull it downwardly upon an increase in speed above a set value. The upper end of rod 12 is pivotally connected at 8 to the mid-point of lever 13. A first linkage mechanism is provided to control the fuel pump and comprises a lever 13 pivotally connected at 30 to link 14 which in turn is connected at its other end to the left-hand end of lever 16. Lever 16 is connected at its right-hand end to fixed pivot 17. Pivotally connected to lever 16 intermediate its ends is the fuel pump control member 9 which controls the output of the fuel pump 7 in accordance with the movement of lever 16, as will be more fully described hereinafter in the method of operation. A "zero oil fuel" stop 18 is provided beneath link 14 to support link 14 and associated lever 16 when the fuel pump 7 is not supplying fuel to the turbine 1. An adjustable stop comprising a threaded screw 19 carried in a stationary nut is also provided for positively locking off the pump control rod 9, or for limiting the amount of fuel supplied by the fuel pump if such action is desired.

The linkage mechanism for controlling the gas valve 6 is similar to that previously described for the fuel pump, and comprises a link 15 pivotally connected at 31 to the left-hand end of lever 13 and at 32 to the right-hand end of lever 20 which in turn is connected at its left-hand end to fixed pivot 21. Connected to rod 20 intermediate its ends is the gas valve control member 10 which controls the setting of the gas valve in accordance with the movement of lever 20. Adjustable stop 26 located adjacent lever 20 is adjustable to limit the counterclockwise movement of lever 20 and thus determine the maximum opening of valve 6. An adjustable stop member which may be referred to as a "zero gas fuel" stop 23 is provided to limit the downward movement of link 15 and lever 20 when the gas valve 6 is shut off.

The fuel control mechanism further includes yieldable bias means which has been illustrated as a tension spring 24 connected between support 27 and lever 13 intermediate the governor control rod 12 and link 14. Tension spring 24 biases lever 13 in a clockwise direction about pivot 8 to tend to maintain link 14 against stop 18 and fuel pump 7 at zero delivery for reasons which will be apparent from the method of operation to be described hereinafter.

In the event the available gas supply is reduced due to greater consumption upstream of the valve 6 for heating or other purposes, the modification disclosed in Fig. 2 is employed. In this embodiment, stop 26 is schematically illustrated as being positioned by a reversible electric motor 33 acting through gearing 34. The motor 33 is controlled by a pressure actuated switch 35 which is responsive to the pressure in inlet conduit 5a through interconnecting conduit 4. The switch is set so that if the pressure in conduit 5 drops below a predetermined amount, the motor circuit will be closed to energize the motor and move stop 26 downwardly to engage lever 20 and partially close valve 6 to raise the gas pressure in inlet conduit 5a back to the preselected amount. When the pressure in conduit 5a is returned to the preselected condition, the circuit will open to shut off the motor. Conversely, if the available gas supply is returned to normal, the motor 33 will be actuated by manual switch 35a to raise stop 26 and permit valve 6 to operate between closed and fully open position. Thus, stop 26 is automatically adjusted so that the maximum opening of gas control valve 6 does not reduce the gas pressure in inlet conduit 5a below a preselected amount. Accordingly, the dual fuel system disclosed in Fig. 2 operates on gas to the maximum amount permitted by stop 26, which is regulated in accordance with the pressure in conduit 5a, and then if additional fuel is required, operates on gas and oil in a manner which will be apparent from the method of operation of the dual fuel system described hereinafter.

This dual fuel system operates in the following manner.

First, it is to be noted that Fig. 1 illustrates the fuel control mechanism set to operate the turbine primarily on gas and to supply oil in the event the turbine requirements exceed the gas supply permitted by the setting of adjustable stop 26. If it is desired to operate the turbine only on gas, stop 19 is adjusted to lock lever 16 against stop 18 to prevent movement of fuel pump lever 16 by governor 11. The movement of speed governor 11 would then control movement of gas control rod 10 through lever 13, link 15 and lever 20 to regulate the supply of gas through conduit 5 to turbine 1. If operation on oil only is desired, it is obvious that it is only necessary to withdraw stop 19 to unlock lever 16 and lock lever 20 against stop 23 by the action of threaded screw 26. When operating on only gas or oil, spring 24 performs no useful function and could be eliminated.

Referring again to Fig. 1, which illustrates the setting of the control mechanism to permit dual fuel operation, upon a decrease in the speed of governor 10, the speed control rod 12 is pushed up causing lever 13 to pivot clockwise about pivot 30 to raise link 15 and pivot lever 20 counterclockwise about pivot 21. Counterclockwise movement of lever 20 raises control rod 10 to increase the flow of gas through gas control valve 6. Upward movement of link 14 and corresponding movement of lever 16 and control rod 9 is prevented by the downward bias of spring 24.

Continuing upward movement of rod 12 results in an increased quantity of gas being supplied to the turbine through valve 6, until lever 20 engages stop 26. Upon a demand for fuel in excess of that permitted by gas valve 6 due to engagement of lever 20 with stop 26, lever 13 is moved counterclockwise about pivot 31 overcoming the bias of spring 24 to raise link 14 and lever 16 to actuate control rod 9 and pump 7 to supply oil to the fuel nozzle 3. If the requirements of the turbine continue to increase, further upward movement of rod 12 results in more oil being supplied to the turbine while maintaining the preselected maximum open adjustment of gas control valve 6. Conversely, if the total fuel requirements are reduced, rod 12 descends and spring 24 first biases lever 13 in a clockwise direction about pivot 31, link 14 moves downwardly, and lever 16 rotates counterclockwise about fulcrum 17 to decrease and finally close off the fuel supply through fuel pump 7, after which lever 20 is moved downwardly away from stop 26 to reduce the gas flow through valve 6, in a manner which will be obvious from the drawing. It is to be noted that the gas control valve 6 and fuel pump 7 and the proportions of the various levers must be so designed that in response to a given movement of lever 13, the turbine load change produced by a change in fuel gas flowing through the control valve 6 will be substantially identical to the load change produced by an equivalent change in fuel oil rate from pump 7. Therefore, any change in total fuel rate is substantially constant for a given amount of governor movement, regardless of the respective positions of the gas control valve 6 and fuel pump regulator 7d.

Thus, it can be appreciated that the dual fuel system comprises a governor controlled lever mechanism that controls a first fuel control means to supply a preselected quantity of a preferred fuel to the gas turbine while maintaining a second fuel control means ineffective and thereafter to regulate the second fuel control means to provide a second fuel in the event the turbine requirements exceed the preselected amount of the first fuel.

While the dual fuel system is illustrated as operating on gas as the preferred fuel, it is obvious that oil can be made the preferred fuel by simply locating spring 24 on the left-hand side of pivot 8. Also, this arrangement is not limited to a duel fuel system operating on gas and oil but would work the same for any combination of two fluids, whether gases, liquids, or powdered solid fuel entrained in an air stream, etc., the relative flows of which are to be regulated.

It will be appreciated that the structure described specifically herein is intended to be illustrative only and actual embodiments of the invention may take many forms. For example, the mechanism for controlling stop 26 in response to the pressure in conduit 5a may take many forms.

It is, of course, intended to cover by the appended claims all such modifications as fall within the true spirit and scope of the invention.

What I claim as new and desire to secure by Letters Patent of the United States is:

1. A dual fuel system for a thermal powerplant comprising first and second sources of fluid fuel under pressure, first and second conduit means for supplying fuel from said sources to the powerplant, first and second control means to control the flow of fuel through said respective first and second conduits, means responsive to a speed condition in the powerplant, first linkage means interconnecting said speed responsive means with said first control means, second linkage means interconnecting said speed responsive means with said second control means, adjustable stop means adapted to be engaged by said first linkage means to limit the opening movement of said first control means to an intermediate fuel flow position, pressure responsive actuating means for positioning the adjustable stop means, said pressure responsive means being responsive to the pressure in the first conduit means on the inlet side of said first control means, whereby when the pressure drops in the first conduit the actuating means will operate to change the position of the stop means to limit the maximum opening of the first control means to the intermediate fuel flow position to prevent the inlet pressure from falling below a predetermined amount, and yieldable bias means effective to prevent the movement of said second linkage means to actuate said second control means until said first linkage means engages said stop means, whereby the powerplant is supplied fuel through said first conduit means and first control means until the quantity as determined by the adjustable stop means is being used, and thereafter said second linkage means is rendered effective to actuate said second control means to supplement the flow of fuel through said first control means to maintain powerplant speed unaffected by the position of the adjustable stop means.

2. In a dual fuel system for a thermal powerplant adapted to be supplied with fuel from first and second sources of fluid fuels under pressure, the combination of first and second conduit means for connection to said sources of fluid fuel and to said powerplant, first and second fluid control means interposed in said first and second conduit means respectively, a speed responsive governor, a main fuel control lever having a first end portion connected through first linkage means to said first control means, means interconnecting the governor and an intermediate portion of said fuel control lever to position said main lever in accordance with the speed of the governor, the second end portion of said main lever connected through second linkage means to regulate said second control means, adjustable stop means adapted to be engaged by said first linkage means for limiting movement of said first linkage means after said first control means is opened to an intermediate fuel flow position, pressure responsive actuating means for positioning the adjustable stop means, said pressure responsive means being responsive to the pressure in the first conduit means on the inlet side of the first control means, whereby the adjustable stop means is responsive to the fluid pressure in said first conduit means to regulate the position of the adjustable stop means to limit the maximum opening of the first control means to the intermediate fuel flow position to prevent the pressure in the first conduit means from falling below a predetermined amount, and yieldable bias means secured to the second linkage means for preventing movement of said second control means until said first linkage means engages said stop means, whereby the powerplant is supplied fuel through the first conduit means and first control means until the governor moves the first linkage means through said main control lever into contact with the adjustable stop means after which the second linkage means is actuated by the governor against the bias of said spring means to regulate the second control means to supply additional fuel to maintain powerplant speed unaffected by the position of the adjustable stop means.

References Cited in the file of this patent

UNITED STATES PATENTS

| | | |
|---|---|---|
| 2,400,219 | Barnaby et al. | May 14, 1946 |
| 2,400,247 | Miller et al. | May 14, 1946 |
| 2,637,334 | Starkey | May 5, 1953 |
| 2,690,167 | Moulton | Sept. 28, 1954 |
| 2,794,430 | Moulton | June 4, 1957 |